May 29, 1962  E. HUGHES  3,036,487
FASTENER
Filed April 21, 1958
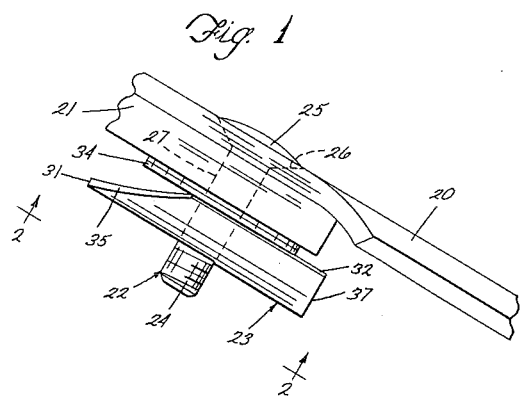
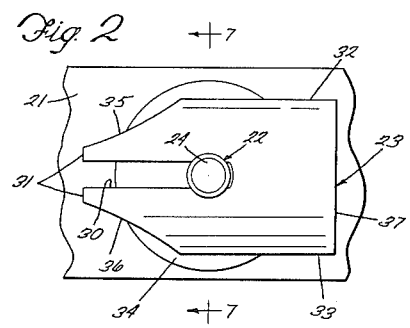
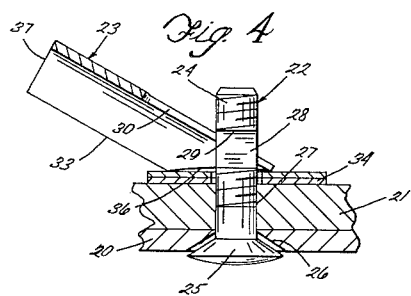
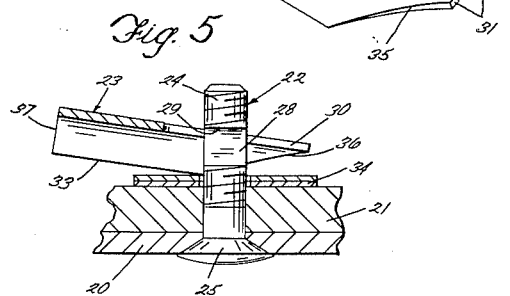
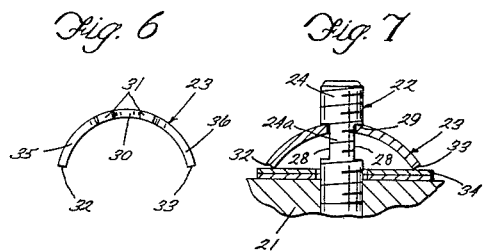
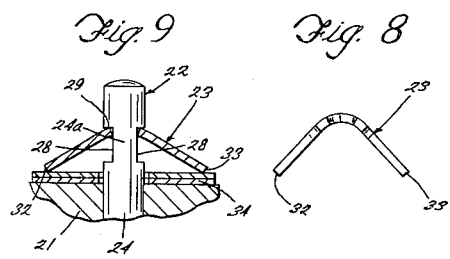
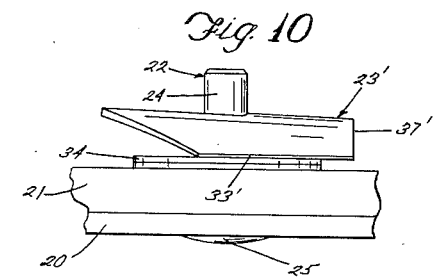
INVENTOR.
Ed Hughes
BY Stuh Wells
Atty.

United States Patent Office 3,036,487
Patented May 29, 1962

3,036,487
FASTENER
Ed Hughes, Garden City, Kans.
(350 28th St., Boulder, Colo.)
Filed Apr. 21, 1958, Ser. No. 730,004
3 Claims. (Cl. 85—7)

The present invention relates to improvements in fasteners, and more particularly to improvements in fasteners such as bolts and the like.

Bolts and nuts are used extensively as a means of securing two or more elements together where it is desirable to connect the elements so that they can be separated at a later time. Bolts and nuts are normally well adapted for this purpose for the reason that they are capable of withstanding considerable stress, and yet are designed for manual separation at any time. In certain cases, however, as where the bolts and nuts are subjected to the weather for long periods of time or where they are so located that they may be struck or bumped by objects, manual separation may become exceedingly difficult, or impossible. The bolts and nuts may become so rusted and/or deformed that they "freeze" or lock together and cannot be loosened. Where this situation arises, considerable labor and expense may be necessary to disconnect the elements secured together.

Examples of such situations are numerous. For instance, in agricultural cultivators wherein replaceable cultivating points are bolted to arms depending from the framework of the implement, operators frequently find that the bolts securing the points are so rusted and/or deformed through engagement with rocks, etc. that they cannot be loosened. Valuable time is wasted cutting the bolts when the points need replacing.

It is the purpose of this invention to provide a simple fastener adapted to perform the function of a bolt and nut but which is not subject to "freezing" or locking when exposed to the elements for long periods and which can easily be removed, although worn or deformed.

A further purpose of the invention is to provide a fastener of the character described which may be secured or released without a wrench or other special tool, but by one or two sharp blows with a hammer or other object.

A still further object of the invention is to provide such a fastener which exerts a substantial compressive force against the members clamped thereby.

Another purpose of the invention is to provide a fastener of the character described which is not susceptible to loosening through vibration.

These and other objects and advantages of my invention will appear more clearly from the following description and the accompanying drawings wherein a preferred form of the invention is shown. It should be understood, however, that the drawings and description are illustrative only, and are not intended to limit the invention except insofar as it is limited by the claims.

In the drawings:

FIGURE 1 is a fragmentary elevational view of a fastener constructed in accordance with my invention, securing a cultivating point to a depending arm of a cultivator;

FIGURE 2 is a view of the device looking in the direction of the arrows 2—2 of FIGURE 1;

FIGURE 3 is a perspective view of the spring securing clip which forms part of my invention;

FIGURE 4 is a sectional view illustrating the parts of the fastener in position to be forced together;

FIGURE 5 is a view like FIGURE 4, but showing the clip partially engaged with the bolt;

FIGURE 6 is an end view of the clip;

FIGURE 7 is a view taken on the line 7—7 of FIGURE 2, showing the clip in place;

FIGURE 8 is a view like FIGURE 6, but showing a slightly modified form of the invention;

FIGURE 9 is a view like FIGURE 7, but showing the modified clip of FIGURE 8; and FIGURE 10 is an elevational view illustrating a further modification of the invention.

Referring now to the drawings, and to FIGURES 1 and 2 in particular, I have shown my improved fastener performing the function of securing a cultivating point 20 to a depending arm or shank 21 of a cultivator (not shown). The fastener itself comprises two elements, a pin or bolt 22, and a spring securing clip 23. The pin 22 includes a generally cylindrical shank 24 having an enlarged head 25 at one end thereof. The pin 22 is received through apertures 26 and 27 in the members 20 and 21 to be joined so that the shank 24 protrudes a substantial amount, as shown in the drawings. The protruding portion of the shank 24 has grooves 28 on the opposite sides thereof. These grooves 28 provide shoulders 29 on the shank 24 facing toward the head 25. The shoulders 29 provide means for engaging the pin 22 with the clip 23.

The spring securing clip 23, best illustrated in FIGURE 3, is a spring metal plate which has a slot 30 therein extending from one end edge 31 inwardly, parallel to the side edges 32 and 33. This slot 30 is wide enough to receive the narrow shank portion 24a between the grooves 28, but narrower than the full diameter of the shank 24. The clip 23 is engaged with the pin 22 by sliding it over the pin 22 so that the narrow shank portion 24a is received in the slot 30 as shown in FIGURE 2. When the clip 23 is in place, the portions thereof on each side of the slot 30 engage against the shoulders 29 and prevent endwise movement of the pin 22 with respect to the clip 23. The members 20 and 21 to be connected are secured between the clip 23 and the enlarged head 25 of the pin 22.

To rigidly connect the members 20 and 21 together, it is necessary to clamp them together with some source. According to my invention, this clamping force or pressure is provided by bowing the clip 23 in a direction transverse to the slot 30, to position the side edges 32 and 33 susbtantially below the level of the slot 30 and to form a raised central crown on the clip 23. It will be understood that if the distance between the shoulders 29 and the adjacent surface of one of the members to be clamped is less than the distance between the plane of the slot 30 and the plane of the edges 32 and 33 of the clip 23, then the clip 23, when in place as shown in FIGURE 7, will be straightened from its normal curvature somewhat, and the tendency of the spring metal to return to the normal curvature will exert a pressure against the members clamped between the clip 23 and the head 25 of the pin 22. This pressure will rigidly clamp the members to be secured in place, and will also keep the clip 23 locked in position against casual movement.

Since, as above stated, the clamping force of the fastener is derived from deforming the spring metal of the clip 23, it is always necessary that the distance from the surface upon which the clip 23 rests to the shoulders 29 be slightly smaller than the distance from the plane of the edges 32 and 33 of the clip 23 to the plane of the slot 30 when the clip is unflexed. The thickness of the members to be joined will vary, of course, and while pins 22 of various lengths may be provided, it is impossible to provide pins 22 of the exact length necessary for every thickness. I therefore utilize washers or shims 34 to support the clip 23 at the proper level. More or less shims may be used as needed for various thicknesses. It is also necessary that the edges 32, 33 lie within the space bounded by a first plane tangent to the crown of clip 23 and a parallel second plane containing the ends of edges 32, 33 directed toward the open end of slot 30. This insures that the clip 23 will not tend to slide from engagement of shoulders 29 due to its internal spring action.

The clip 23 is designed to be driven into place on the pin 22 by a blow or blows of a hammer or other object. To permit the clip 23 to be initially engaged, and to provide means for flexing the clip as it is driven, the side edges 32 and 33 of the clip are tapered near the end 31 as shown in FIGURES 4 and 5 these tapers permit the clip 23 to be engaged with the pin 22 while unflexed, and cause the clip to be flexed gradually as it is driven over the pin by blows on its rear edge 37. When the clip 23 has been driven far enough to move the junction between the tapered portions 35 and 36 and the side edges 32 and 33 beyond the center line of the pin 22, the clip will be fully flexed, and forced into a position wherein the edges 32 and 33 lie flat upon the shims 34 therebeneath. Frictional engagement between the edges 32 and 33 and the shims 34, as well as frictional engagement between the clip and the shoulders 29 will prevent casual removal thereof. When desired, the clip may be quickly removed by one or more sharp blows against the front edge 31.

If more positive locking of the clip 23 is desired, it may be formed as shown at 23' in FIGURE 10, so that the edges 33' taper inwardly toward the rear edge 37' and toward a plane which is tangent to the crown of the clip 23'. With these edges so tapered, the up raised intermediate portion of the clip 23' will be tilted slightly to the rear after the clip 23' has been fully set, so that movement of the shank portion 24a toward the closed end of the slot 30' in the clip 23' will tend to relax the clip. The tendency to return to unflexed condition will thus keep the pin shank portion 24a against the closed end of the slot 30'.

Another means of insuring against casual disengagement of the clip (not shown in the drawings) is to cut the side edges 32 and 33 so that one tapers inwardly (as the edge 33' in FIGURE 10) and the other tapers outwardly. This will cause the clip to twist slightly as it is flexed and as the edges 32 and 33 are pressed against the shims 34, thus causing it to bind against the shank 24a of the pin 22.

In FIGURES 1, 4, 5 and 7 of the drawings, I have shown the pin 22 as a threaded bolt which may be used with a standard nut, if desired. It will be understood that inasmuch as the clip 23 is not engaged by threading, it is not necessary that the pin 22 be threaded, or that the head 25 be formed for engagement by a wrench or other tool. FIGURES 9 and 10 illustrate a pin 22 not having threads thereon.

In FIGURES 8 and 9, I have shown a clip which is bent in a substantially V-shape, instead of a smooth curve as shown in FIGURES 3 and 6. It will be understood that either a V or a smooth curve may be used with equally satisfactory results. Any curvature which will position the edges 32 and 33 away from the plane of the slot 30, and which will permit the clip to flex, is sufficient.

It should be apparent from the foregoing that my improved fastener provides a novel and useful means for clamping two or more elements together in the manner of a bolt and nut, but which is not subject to the limitations and difficulties accompanying the use of nuts or bolts. Even if the clip becomes rusted or worn and deformed, one or two sharp blows of a hammer or other object is sufficient to engage or disengage it from the pin 22. The fastener is thus quickly secured and released easily and quickly under the most adverse conditions.

Having thus described my invention, I claim:

1. Means for securing members together comprising a bolt having head means to engage one member and a shank adapted to extend through the members and to protrude beyond them, the shank being reduced in cross section intermediate the ends thereof providing shoulders remote from the head facing the head, an elongated spring metal clip having a slot extending lengthwise thereof and fitting the reduced portion of said shank but too narrow to receive the end portions of said shank, said slot opening to one end edge of the clip and terminating a substantial distance from the other end thereof and being substantially midway between the side edges of the clip, the clip being bowed in a direction transverse to the slot to position the member engaging side edges thereof endwise of the bolt from the slot and to form a raised crown along the center of the clip, the side edges of the clip tapering toward the slot from respective points located intermediate the ends of said slot to the end edge of the clip at which said slot opens, said side edges further extending from said intermediate points to the remaining end edge of the clip within the space bounded by a first plane tangent to the crown of the clip and a parallel second plane containing said intermediate points.

2. Means for securing members together comprising a bolt having head means to engage one member and a shank adapted to extend through the members and to protrude beyond them, the shank being reduced in cross section intermediate the ends thereof providing shoulders remote from the head facing the head, an elongated spring metal clip having a slot extending lengthwise thereof and fitting the reduced portion of said shank but too narrow to receive the end portions of said shank, said slot opening to one end edge of the clip and terminating a substantial distance from the other end thereof and being substantially midway between the side edges of the clip, the clip being bowed in a direction transverse to the slot to position the member engaging side edges thereof endwise of the bolt from the slot and to form a raised crown along the center of the clip, the side edges of the clip tapering toward the slot from respective points located intermediate the ends of said slot to the end edge of the clip at which said slot opens, said side edges also tapering toward a plane which is tangent to the crown of the clip from said points to the other end edge of the clip.

3. A securing clip adapted for engagement with a bolt to connect two or more members together comprising a spring metal plate having an elongated slot therein between the side edges and opening to one end edge, but terminating a substantial distance from the other end edge of the clip, said plate being bent laterally of the slot edges to offset the side edges of the plate from the plane of the slot edges and to form a raised crown along the center of the clip, the side edges of said plate converging toward both ends of the plate and toward a plane which is tangent to the crown of the clip from a spread of maximum width intermediate the slot length, the converging angle of said side edges toward the closed end of said plate being less than converging angle of said side edges toward the open end of said plate.

References Cited in the file of this patent

UNITED STATES PATENTS

| | | |
|---|---|---|
| 565,698 | Sparks | Aug. 11, 1896 |
| 2,034,559 | Brunner | Mar. 17, 1936 |
| 2,236,130 | Betebenner | Mar. 25, 1941 |
| 2,357,722 | Balduf | Sept. 5, 1944 |
| 2,505,955 | Fuller | May 2, 1950 |
| 2,709,390 | Smith | May 31, 1955 |
| 2,798,406 | Steck | July 9, 1957 |
| 2,892,236 | Ewald | June 30, 1959 |

FOREIGN PATENTS

| | | |
|---|---|---|
| 119,061 | Great Britain | Oct. 26, 1944 |